US012567187B2

(12) United States Patent
Smetanin et al.

(10) Patent No.: US 12,567,187 B2
(45) Date of Patent: Mar. 3, 2026

(54) TECHNIQUES FOR GENERATING A STYLIZED MEDIA CONTENT ITEM WITH A GENERATIVE NEURAL NETWORK

(71) Applicant: Snap Inc., Santa Monica, CA (US)

(72) Inventors: Sergey Smetanin, London (GB); Pavel Savchenkov, London (GB); Viktar Atliha, London (GB); Georgii Grigorev, Amsterdam (NL); Ivan Babanin, London (GB); Prasad Tare, Flushing, NY (US); Inna Zaitseva, West New York, NJ (US); Anna Kovalenko, London (GB); Dmytro Rudenko, Amsterdam (NL)

(73) Assignee: Snap Inc., Santa Monica, CA (US)

( * ) Notice: Subject to any disclaimer, the term of this patent is extended or adjusted under 35 U.S.C. 154(b) by 186 days.

(21) Appl. No.: 18/505,785

(22) Filed: Nov. 9, 2023

(65) Prior Publication Data

US 2024/0412433 A1     Dec. 12, 2024

Related U.S. Application Data

(60) Provisional application No. 63/506,756, filed on Jun. 7, 2023.

(51) Int. Cl.
*G06F 3/0482*     (2013.01)
*G06F 3/0488*     (2022.01)
(Continued)

(52) U.S. Cl.
CPC ............ *G06T 11/60* (2013.01); *G06F 3/0482* (2013.01); *G06F 3/0488* (2013.01); *G06T 13/80* (2013.01); *G06T 2200/24* (2013.01)

(58) Field of Classification Search
CPC ................................................ G06F 3/048–05
See application file for complete search history.

(56) References Cited

U.S. PATENT DOCUMENTS 11,196,816 B2 * 12/2021 Al Majid .............. G06F 3/0482
11,809,688 B1 * 11/2023 Parasnis .............. G06F 3/04845
(Continued)

FOREIGN PATENT DOCUMENTS

WO          2024254342          12/2024

OTHER PUBLICATIONS

"International Application Serial No. PCT US2024 032862, International Search Report mailed Sep. 13, 2024", 3 pgs.
(Continued)

*Primary Examiner* — Daniel Rodriguez
(74) *Attorney, Agent, or Firm* — Schwegman Lundberg & Woessner, P.A.

(57)          ABSTRACT

A mobile application with an improved user interface facilitates generating stylized media content items including images and videos. An end-user selects a desired visual effect from a set of options. The mobile application captures or accesses an image. The image is processed on a server using a generative neural network pre-trained to apply stylizations based on the selected effect. The server sends back the stylized image to the mobile application for display. The end-user can then save the stylized image or generate a video (e.g., an animation) showing the original image transition to the stylized image. The user interface provides an efficient creative workflow to apply aesthetic enhancements in a visual style chosen by the end-user. Generative machine learning techniques automate stylization to enable accessible media customization and sharing.

18 Claims, 10 Drawing Sheets

(51) Int. Cl.
    *G06T 11/60*         (2006.01)
    *G06T 13/80*         (2011.01)

(56)            References Cited

U.S. PATENT DOCUMENTS

| | | | | |
|---|---|---|---|---|
| 2013/0286018 | A1* | 10/2013 | Freyhult | H04N 1/32106 345/428 |
| 2015/0365600 | A1* | 12/2015 | Pollack | H04N 5/2621 348/239 |
| 2016/0154941 | A1* | 6/2016 | LaBorde | G06F 21/6245 705/3 |
| 2019/0362836 | A1* | 11/2019 | Gruemer | G16H 30/40 |
| 2020/0117348 | A1* | 4/2020 | Jang | G06F 3/0482 |
| 2020/0175729 | A1* | 6/2020 | Lee | G06N 3/045 |
| 2020/0202502 | A1* | 6/2020 | Tsymbalenko | G06T 5/60 |
| 2020/0344411 | A1* | 10/2020 | Cragg | H04N 23/64 |
| 2021/0065454 | A1* | 3/2021 | Goodrich | G06T 19/006 |
| 2021/0182624 | A1* | 6/2021 | Tulyakov | G06N 3/094 |
| 2021/0203627 | A1* | 7/2021 | Luo | G06F 3/04886 |
| 2021/0224403 | A1* | 7/2021 | Amthor | G06T 7/0012 |
| 2021/0304449 | A1* | 9/2021 | Mourkogiannis | G06T 11/60 |
| 2021/0390247 | A1* | 12/2021 | Goodsitt | G06F 40/103 |
| 2022/0094899 | A1* | 3/2022 | Inada | G06T 7/90 |
| 2022/0101566 | A1* | 3/2022 | Boscolo | H04L 51/046 |
| 2022/0124257 | A1* | 4/2022 | Zhao | H04N 5/265 |
| 2022/0215463 | A1* | 7/2022 | Sartori Odizzio | G06F 3/04845 |
| 2024/0005466 | A1* | 1/2024 | He | G06T 7/12 |
| 2024/0193351 | A1* | 6/2024 | Benedetto | G06F 3/0482 |
| 2024/0193821 | A1* | 6/2024 | Denison | G06F 3/04845 |
| 2024/0201833 | A1* | 6/2024 | Abel | G06F 16/5866 |
| 2024/0273794 | A1* | 8/2024 | Zhou | G06T 11/60 |
| 2024/0273796 | A1* | 8/2024 | Edson | G06T 13/00 |
| 2025/0173878 | A1* | 5/2025 | Zhang | G06T 11/00 |

OTHER PUBLICATIONS

"International Application Serial No. PCT US2024 032862, Written Opinion mailed Sep. 13, 2024", 8 pgs.

* cited by examiner

400

402 — MSG_ID

404 — MSG_TXT

406 — MSG_IMAGE → IMAGE TABLE — 312

408 — MSG_VID → VIDEO TABLE — 304

410 — MSG_AUD

412 — MSG_AUG → AUGMENTATION TABLE — 310

414 — MSG_DUR

416 — MSG_LOCATION

418 — MSG_STORY_ID

420 — MSG_TAG

422 — MSG_SENDER_ID → ENTITY TABLE — 306

424 — MSG_RECEIVER_ID

TECHNIQUES FOR GENERATING A STYLIZED MEDIA CONTENT ITEM WITH A GENERATIVE NEURAL NETWORK

RELATED APPLICATIONS

This application claims the benefit of and priority to U.S. Provisional Patent Application No. 63/506,756, filed on Jun. 7, 2023, the entire contents of which are incorporated herein by reference.

TECHNICAL FIELD

The present disclosure generally relates to an improved user interface to facilitate generating shareable media content items (e.g., still images and videos) that are stylized, based on an end-user preference, using a fine-tuned generative neural network model based on a latent diffusion technique and implemented on a server-side system.

BACKGROUND

In recent years, the rapid evolution of mobile technology has enabled people to more easily create, edit, and share visual content. Advances in mobile phone cameras, processors, and networks have allowed individuals to capture high-quality photos and videos with their devices. The widespread adoption of smartphones and tablets has put robust image editing capabilities directly into the hands of everyday users. Mobile apps provide intuitive interfaces and powerful creative tools, making it simple for anyone to generate and share media content. The combination of capable mobile hardware and software has empowered people to express themselves visually and share their experiences with a global audience. Individuals can now utilize their mobile devices to explore photography and videography, convey ideas, and unleash their creativity.

BRIEF DESCRIPTION OF THE DRAWINGS

In the drawings, which are not necessarily drawn to scale, like numerals may describe similar components in different views. To easily identify the discussion of any particular element or operation, the most significant digit or digits in a reference number refer to the figure number in which that element is first introduced. Some non-limiting examples are illustrated in the figures of the accompanying drawings in which.

DETAILED DESCRIPTION

Figure 1:
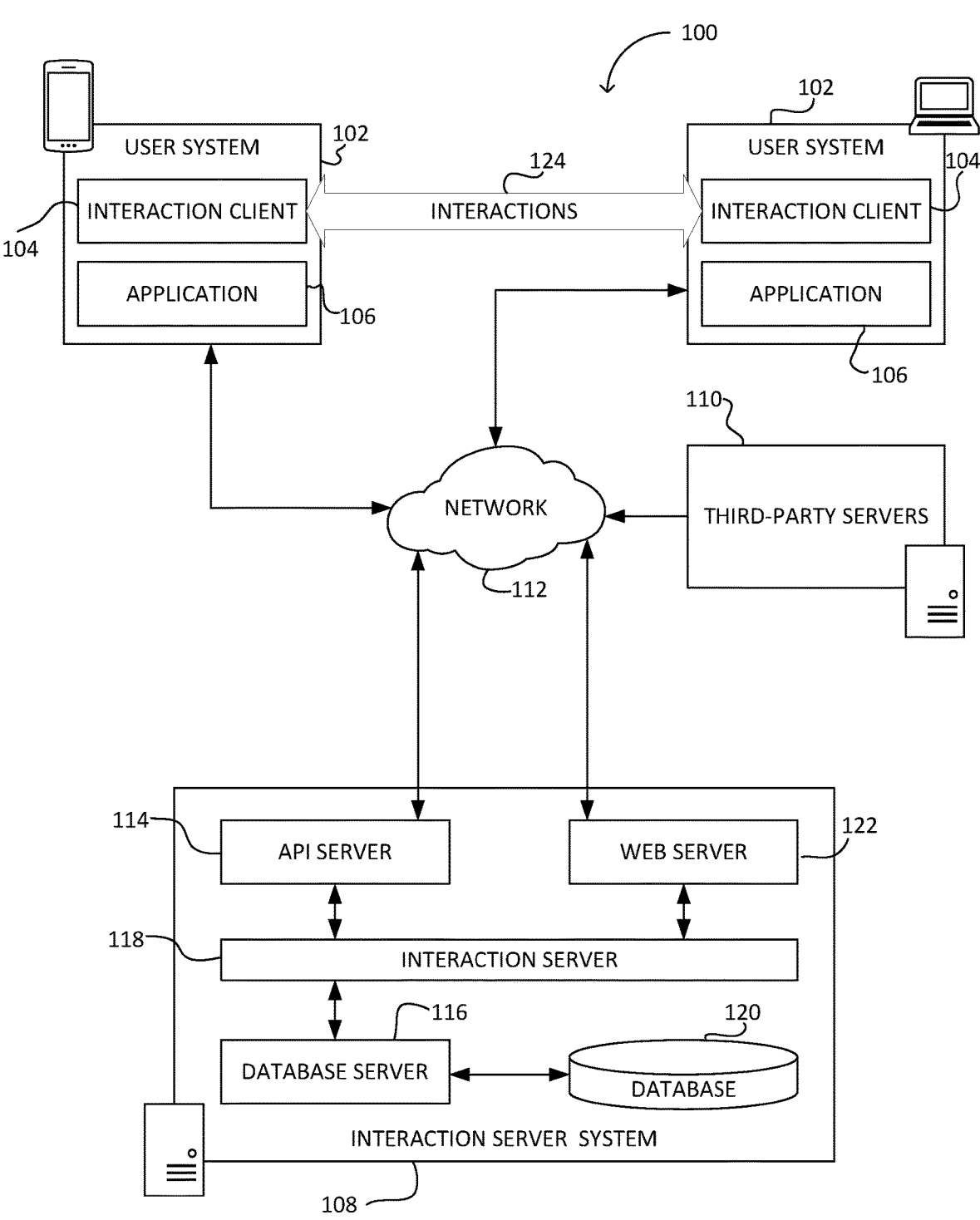
FIG. 1 is a diagrammatic representation of a client/server network-based environment in which a messaging application and service, may be deployed.

Described herein is an improved user interface that allows an end-user of a mobile application to quickly and efficiently select a special effect for stylizing a photo or video, capture or select a photo or video to be stylized with a particular special effect, generate a stylized version of the photo or video based on the selected effect, and then save or share the resulting stylized photo or video. In the following description, for purposes of explanation, numerous specific details and features are set forth in order to provide a thorough understanding of the various aspects of different examples. It will be evident, however, to one skilled in the art, that the present invention may be practiced and/or implemented with varying combinations of the many details and features presented herein.

Traditionally, many online services, including social media platforms, have relied on user-generated content, where individuals manually capture and upload their media content items. Generating content for these online services poses several challenges, primarily due to the learning curve associated with using advanced photo and video editing applications. These advanced tools are often designed for desktop usage, making them less intuitive and accessible for mobile users. Moreover, the disconnect between desktop-oriented applications and mobile content creation platforms can hinder the smooth workflow and creative process for content creators.

In addition, the process of generating compelling content, especially when incorporating novel stylized effects and filters, can be time-consuming. Exploring and mastering the various features and functionalities of editing software takes considerable effort, further lengthening the content creation process. This time investment becomes more pronounced when users strive for uniqueness and originality, constantly seeking out fresh and engaging elements to captivate their audience. Similar challenges arise in the context of video editing, as mobile video editing applications often lack the comprehensive features and robustness found in desktop software. This limitation hampers the ability to create professional-looking videos with intricate effects and precise control, impacting the quality and overall impact of shared media content.

To address these challenges, and others, embodiments of the present invention provide an extremely easy and efficient workflow for end-users of a mobile application, allowing end-users to create and share unique and engaging stylized images and videos, with a minimal learning curve. As described herein, embodiments of the present invention leverage a fine-tuned generative neural network model based on a latent diffusion technique in the process of stylizing an input image by iteratively refining the image through a series of update steps. The neural network model may be pre-trained to generate different stylized effects, based on a text prompt. This is achieved through a technique called conditional or text-guided generation. The neural network model is trained using a training dataset that includes pairs of text prompts and corresponding stylized images. By learning from the training dataset, the model can associate specific textual descriptions with corresponding visual styles.

During the image stylization process, when given a text prompt and an input image, the trained neural network can use the learned associations to generate a stylized version of the input image that aligns with the desired style described in the text (e.g., what is commonly referred to as the prompt). This enables the neural network to produce diverse stylized outputs based on different text inputs, allowing for a wide range of style variations to be generated from a single model. The neural network plays a key role in guiding the refinement process and applying desired stylization effects to generate the final stylized output.

As described in greater detail below, an end-user may select a stylized effect from a carousel of such effects, where each element (e.g., icon or graphic) in the carousel represents a different special effect. While some of the special effects may involve augmented reality overlays, at least some of the special effects that may be selected by the end-user involve effects that are achieved through generative artificial intelligence (AI) techniques. Generative AI refers to the application of artificial intelligence techniques, such as deep learning and neural networks, to generate new content based on existing data and patterns, such as existing images and videos.

The integration of generative AI with mobile applications, including social media mobile applications, has opened up a plethora of creative possibilities for end-users. By leveraging generative AI algorithms, individuals can now enhance their content creation process by automating certain aspects, such as image and video generation, stylization, and artistic transformations. This combination of social media and generative AI empowers users to unleash their creativity, regardless of their technical expertise in fields such as graphic design or video editing.

Generative AI enables users to transform their raw media into unique and captivating forms, fostering a culture of creativity and innovation. Through the application of sophisticated algorithms, users can easily apply filters, effects, and other artistic enhancements to their media content, resulting in visually stunning and engaging creations. Moreover, mobile applications (e.g., social media mobile applications) provide a way for users to share and showcase their generative AI-enhanced content with a vast audience. Through seamless integration with these platforms, users can effortlessly upload and disseminate their creations, sparking conversations, inspiring others, and driving the growth of creative communities.

By combining the power of social media mobile applications and generative AI, embodiments of the invention described herein aim to revolutionize the way users engage with content creation and sharing. The integration of these technologies empowers individuals to transcend traditional boundaries and explore new realms of creativity, fostering an environment where anyone can become an artist or content creator.

For purposes of the present disclosure, the terms "message" and "media content item" are used synonymously. As will be readily apparent from the description of the various figures that follow, a message or media content item may consist of various component parts—that is, individual content items, including for example, text, audio, graphics, images, photographs, video and special effects. Many messaging applications provide for the exchange of messages in both a one-to-one (e.g., direct messaging) context, as well as one-to-many. In the case of one-to-many messaging, a messaging application may allow a message sender to specify or select multiple message recipients to receive a message. Similarly, some messaging applications support a feature that has become known within the realm of social media as "stories." A story is specific type of message that is usually a collection of images or videos divided into several short sequences. A story may be accompanied by backgrounds, music, audio, texts, stickers, animations, effects and emojis. Generally, the aim of posting a story is to tell a narrative (e.g., an everyday experience) or to convey a message. In many instances, once a story has been posted, the story may not be editable and may only be available for viewing by others for a short time (e.g., twenty-four hours).

With many messaging applications, content creation tools may allow a content creator to add a hashtag or specify a location to provide further context for a story. The visibility of the story—that is, the audience of possible viewers—may be determined by a social graph defining a network of connected end-users. Alternatively, the content creator may specify that a story is to have a public audience, in which case the story may be viewed by any end-user of the messaging application.

Networked Computing Environment

FIG. 1 is a block diagram showing an example interaction system 100 for facilitating interactions (e.g., generating and editing media content items, exchanging messages or media content items, conducting text, audio and video-based calls, playing games, and/or viewing content) over a network 112. The interaction system 100 includes multiple user systems 102, each of which hosts multiple applications, including an interaction client 104 (which may be a messaging client), and other applications 106. Each interaction client 104 is communicatively coupled, via one or more communication networks including a network 112 (e.g., the Internet), to other instances of the interaction client 104 (e.g., hosted on respective other user system 102), an interaction server system 108 and third-party servers 110). An interaction client 104 can also communicate with locally hosted applications 106 using application programming interfaces (APIs).

An interaction client 104 interacts with other interaction clients 104 and with the interaction server system 108 via the network 112. The data exchanged between the interaction clients 104 (e.g., interactions 124) and between the interaction clients 104 and the interaction server system 108 includes functions (e.g., commands to invoke functions) and payload data (e.g., text, audio, video, or other multimedia data). These functions and their respective payloads may be communicated via various communication protocols.

The interaction server system 108 provides server-side functionality via the network 112 to the interaction clients 104. While certain functions of the interaction system 100 are described herein as being performed by either an interaction client 104 or by the interaction server system 108, the location of certain functionality either within the interaction client 104 or the interaction server system 108 may be a design choice. For example, it may be technically preferable to initially deploy particular technology and functionality within the interaction server system 108 but to later migrate this technology and functionality to the interaction client 104 where a user system 102 has sufficient processing capacity.

The interaction server system 108 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 108, an API server 114 is coupled to and provides programmatic interfaces to interaction servers 118, making the functions of the interaction servers 118 accessible to interaction clients 104, other applications 106 and third-party servers 110. The interaction servers 118 are communicatively coupled to a database server 116, facilitating access to a database 120 that stores data associated with interactions processed by the interaction servers 118. Similarly, a web server 122 is coupled to the interaction servers 118 and provides web-based interfaces to the interaction servers 118. To this end, the web server 122 processes incoming network requests over the Hypertext Transfer Protocol (HTTP) and several other related protocols.

The API server 114 receives and transmits interaction data (e.g., commands and message payloads) between the interaction servers 118 and the user systems 102 (and for example, interaction clients 104 and other application 106) and the third-party servers 110. Specifically, the Application Programming Interface (API) server 114 provides a set of interfaces (e.g., routines and protocols) that can be called or queried by the interaction client 104 and other applications 106, including third-party applications, to invoke functionality of the interaction servers 118. The API server 114 exposes various functions supported by the interaction servers 118, including account registration, login functionality, the sending of interaction data via the interaction servers 118, from a particular interaction client 104 to another interaction client 104, the communication of media files (e.g., images or video) from an interaction client 104 to the interaction servers 118, the settings of a collection of media data (e.g., a story), the retrieval of a list of friends of an end-user of a user system 102, the retrieval of messages and content, the addition and deletion of entities (e.g., friends) to an entity relationship graph (e.g., a social graph), the location of friends within a social graph, and opening an application event (e.g., relating to the interaction client 104).

The interaction server(s) 118 host multiple systems and subsystems, described below with reference to FIG. 2.

System

Figure 2:
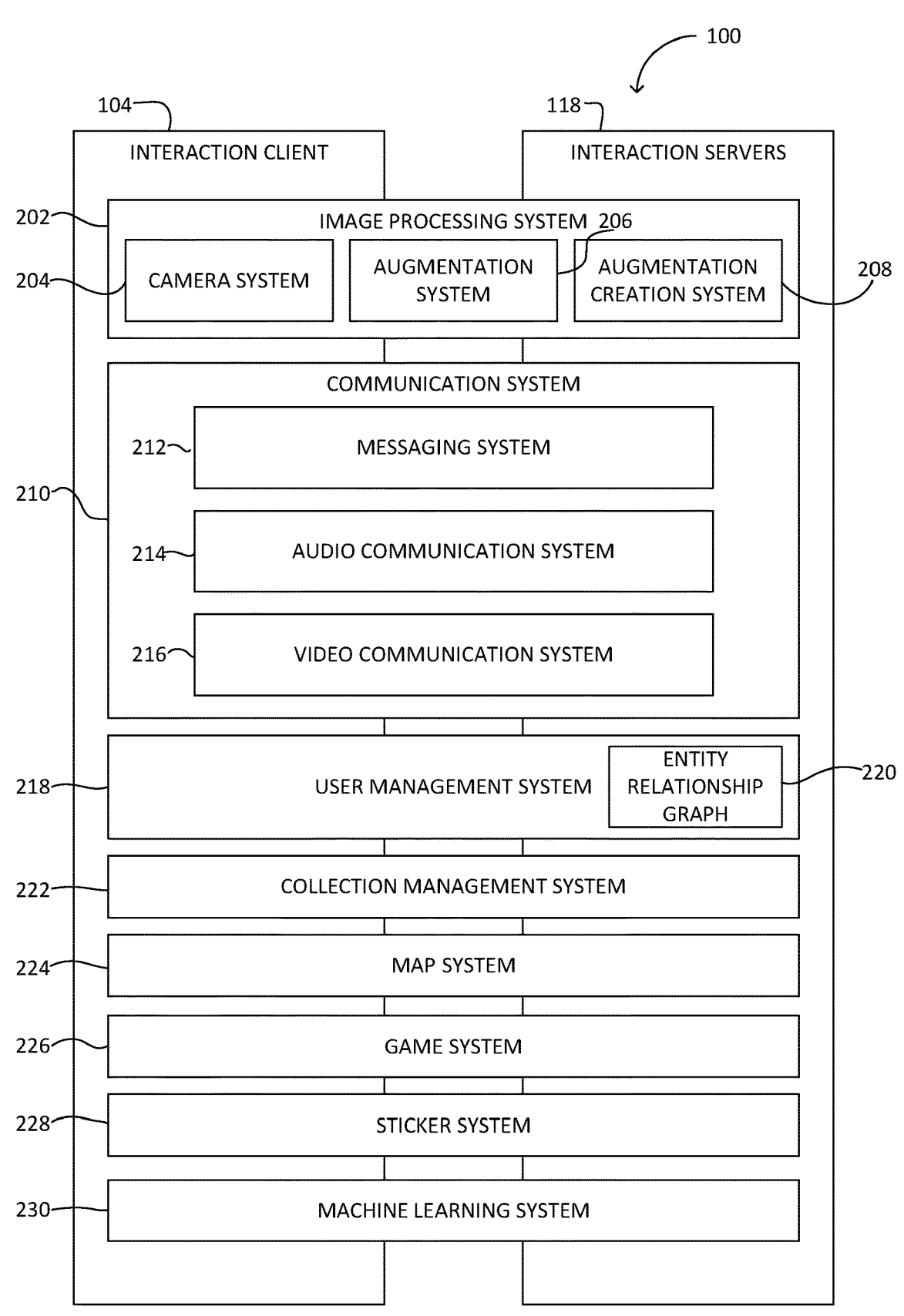
FIG. 2 is a diagrammatic representation of an interaction system that has both client-side and server-side functionality, and with which a messaging application, consistent with some examples, may be deployed.

FIG. 2 is a block diagram illustrating further details regarding the interaction system 100, according to some examples. Specifically, the interaction system 100 is shown to comprise the interaction client 104 and the interaction servers 118. The interaction system 100 embodies multiple subsystems, which are supported on the client-side by the interaction client 104 and on the server-side by the interaction servers 118. Example subsystems are discussed below.

An image processing system 202 provides various functions that enable an end-user to capture and augment (e.g., annotate or otherwise modify or edit) media content. The camera system 204 includes control software (e.g., in a camera application) that interacts and controls an image sensor or camera device (e.g., directly or via operating system controls) of the user system 102 to modify and augment real-time images captured by the image sensor and displayed via the interaction client 104. The augmentation system 206 provides functions related to the generating and publishing of augmentations (e.g., special effects) for images captured in real-time by cameras of the user system 102 or retrieved from memory of the user system 102. For example, the augmentation system 206 operatively selects, presents, and displays media overlays and special effects (e.g., an image filter or an image lens) to the interaction client 104 for the augmentation of images and video received via the camera system 204 or stored images and videos retrieved from memory of a user system 102. These augmentations and special effects are selected by the augmentation system 206 and presented to an end-user of an interaction client 104, based on a number of inputs and data, such as, for example:

Geolocation of the user system 102; and

Social network information of the end-user of the user system 102.

An augmentation or special effect may include audio and visual content and visual effects. Examples of audio and visual content include pictures, texts, logos, animations, and sound effects. An example of a visual effect includes color overlaying. The audio and visual content or the visual effects may be applied to a media content item (e.g., a photo or video) at user system 102 for communication in a message, or applied to video content, such as a video content stream or feed transmitted from an interaction client 104. Alternatively, with some augmentations and special effects, such as those facilitated by a generative neural network, an image or video may be communicated from the interaction client 104 to the interaction server 118, where the image or video is processed with a pre-trained generative neural network to generate a stylized version of the image or video, which is then communicated to the interaction client 104 of the user system 102, where it may be viewed, saved, share, etc. Accordingly, the image processing system 202 may interact with, and support, the various subsystems of the communication system 210, such as the messaging system 212 and the video communication system 216.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 120 and accessed through the database server 116.

The image processing system 202 provides an end-user-based publication platform that enables end-users to select a geolocation on a map and upload content associated with the selected geolocation. The end-user may also specify circumstances under which a particular media overlay should be offered to other end-users. The image processing system 202 generates a media overlay that includes the uploaded content and associates the uploaded content with the selected geolocation.

The augmentation creation system 208 supports augmented reality developer platforms and includes an application for content creators (e.g., artists and developers) to create and publish augmentations (e.g., augmented reality experiences) of the interaction client 104. The augmentation creation system 208 provides a library of built-in features and tools including, for example, custom shaders, tracking technology, and templates.

In some examples, the augmentation creation system 208 provides a merchant-based publication platform that enables merchants to select a particular augmentation associated with a geolocation via a bidding process. For example, the augmentation creation system 208 associates a special effect or media overlay of the highest bidding merchant with a corresponding geolocation for a predefined amount of time.

A communication system 210 is responsible for enabling and processing multiple forms of communication and interaction within the interaction system 100 and includes a messaging system 212, an audio communication system 214, and a video communication system 216. The messaging system 212 is responsible for enforcing the temporary or time-limited access to content by the interaction clients 104. The messaging system 212 incorporates multiple timers (e.g., within an ephemeral timer system 232) that, based on duration and display parameters associated with a message, or collection of messages (e.g., a story), selectively enable access (e.g., for presentation and display) to messages and associated content via the interaction client 104. Further details regarding the operation of the ephemeral timer system 232 are provided below. The audio communication system 214 enables and supports audio communications (e.g., real-time audio chat) between multiple interaction clients 104. Similarly, the video communication system 216 enables and supports video communications (e.g., real-time video chat) between multiple interaction clients 104.

A user management system 218 is operationally responsible for the management of end-user data and profiles and includes an entity relationship graph 220 that maintains information regarding relationships between end-users of the interaction system 100.

Consistent with some examples, the machine learning system 230 utilizes one or more machine learning algorithms to generate a fine-tuned machine learning model, based on a pre-trained machine learning model, which receives as input an image, and generates as output a stylized version of that image.

Data Architecture

Figure 3:
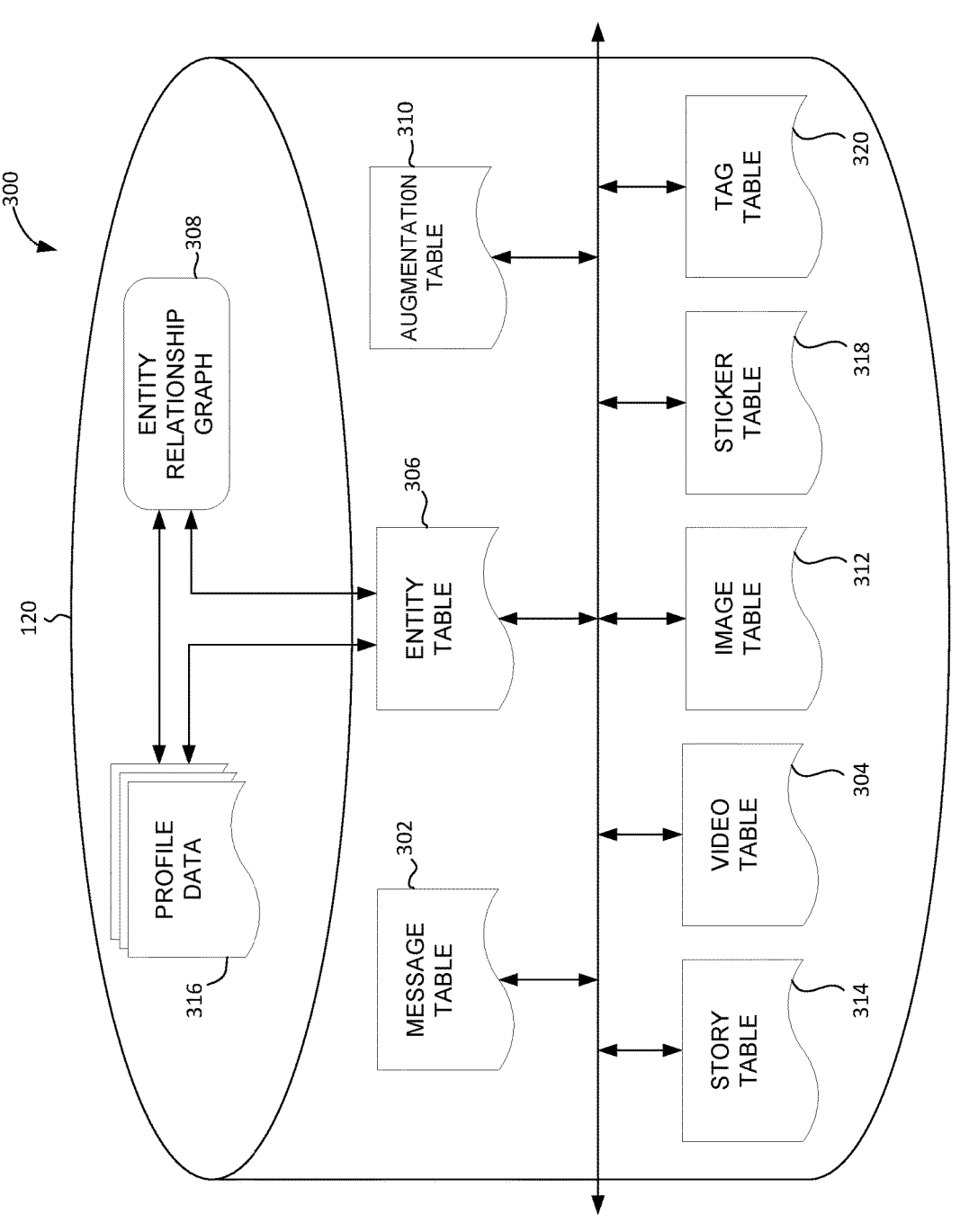
FIG. 3 is a diagrammatic representation of a data structure as maintained in a database, in accordance with some examples.

FIG. 3 is a schematic diagram illustrating data structures 300, which may be stored in the database 120 of the interaction server system 108, according to certain examples. While the content of the database 120 is shown to comprise multiple tables, it will be appreciated that the data could be stored in other types of data structures (e.g., as an object-oriented database, or a graph-based database).

The database 120 includes message data stored within a message table 302. This message data includes, for any particular message, at least message sender data, message recipient (or receiver) data, and a payload (e.g., content of the message). Further details regarding information that may be included in a message, and included within the message data stored in the message table 302, are described below with reference to FIG. 4.

An entity table 306 stores entity data, and is linked (e.g., referentially) to an entity relationship graph 308 and profile data 316. Entities for which records are maintained within the entity table 306 may include individuals, corporate entities, organizations, objects, places, events, and so forth.

Regardless of entity type, any entity regarding which the interaction server system 108 stores data may be a recognized entity. Each entity is provided with a unique identifier, as well as an entity type identifier (not shown).

The entity relationship graph 308 stores information regarding relationships and associations between entities. Such relationships may be social, professional (e.g., work at a common corporation or organization), interest-based, or activity-based, merely for example. Certain relationships between entities may be unidirectional, such as a subscription by an individual end-user to digital content of a commercial or publishing end-user (e.g., a newspaper or other digital media outlet, or a brand). Other relationships may be bidirectional, such as a "friend" relationship between individual end-users of the interaction system 100.

Certain permissions and relationships may be attached to each relationship, and also to each direction of a relationship. For example, a bidirectional relationship (e.g., a friend relationship between individual end-users) may include authorization for the publication of digital content items between the individual end-users, but may impose certain restrictions or filters on the publication of such digital content items (e.g., based on content characteristics, location data or time of day data). Similarly, a subscription relationship between an individual end-user and a commercial end-user may impose different degrees of restrictions on the publication of digital content from the commercial end-user to the individual end-user, and may significantly restrict or block the publication of digital content from the individual end-user to the commercial end-user. A particular end-user, as an example of an entity, may record certain restrictions (e.g., by way of privacy settings) in a record for that entity within the entity table 306. Such privacy settings may be applied to all types of relationships within the context of the interaction system 100, or may selectively be applied to certain types of relationships.

The profile data 316 stores multiple types of profile data about a particular entity. The profile data 316 may be selectively used and presented to other end-users of the interaction system 100 based on privacy settings specified by a particular entity. Where the entity is an individual, the profile data 316 includes, for example, an end-user name, telephone number, address, settings (e.g., notification and privacy settings), as well as a user-selected avatar representation (or collection of such avatar representations). A particular end-user may then selectively include one or more of these avatar representations within the content of messages communicated via the interaction system 100, and on map interfaces displayed by interaction clients 104 to other end-users. The collection of avatar representations may include "status avatars," which present a graphical representation of a status or activity that the end-user may select to communicate at a particular time.

Where the entity is a group, the profile data 316 for the group may similarly include one or more avatar representations associated with the group, in addition to the group name, members, and various settings (e.g., notifications) for the relevant group.

The database 120 also stores augmentation data, such as special effects, overlays and filters, in an augmentation table 310. The augmentation data is associated with and applied to videos (for which data is stored in a video table 304) and images (for which data is stored in an image table 312).

Filters, in some examples, are overlays that are displayed as overlaid on an image or video during presentation to a recipient end-user. Filters may be of various types, including end-user-selected filters from a set of filters presented to a sending user by the interaction client 104 when the sending end-user is composing a message. Other types of filters include geolocation filters (also known as geo-filters), which may be presented to a sending end-user based on geographic location. For example, geolocation filters specific to a neighborhood or special location may be presented within an end-user interface by the interaction client 104, based on geolocation information determined by a Global Positioning System (GPS) unit of the end-user system 102.

Another type of filter is a data filter, which may be selectively presented to a sending end-user by the interaction client 104 based on other inputs or information gathered by the end-user system 102 during the message creation process. Examples of data filters include current temperature at a specific location, a current speed at which a sending end-user is traveling, battery life for an end-user of the system 102, or the current time.

Other augmentation data that may be stored within the image table 312 includes augmented reality content items (e.g., corresponding to applying "lenses" or augmented reality experiences). An augmented reality content item may be a real-time special effect and sound that may be added to an image or a video.

Another type of augmentation is a special effect for stylizing an image or short video. As described in greater detail below, this may be achieved using a pre-trained neural network model, such as the open source Stable Diffusion model, and applying latent diffusion techniques. An image that has been stylized using a pre-trained neural network model may be further enhanced, for example, with overlays and filters, applied at the user system.

A story table 314 stores data regarding collections of messages and associated image, video, or audio data, which are compiled into a collection (e.g., a story or a gallery). The creation of a particular collection may be initiated by a particular end-user (e.g., each end-user for which a record is maintained in the entity table 306). An end-user may create a "personal story" in the form of a collection of content that has been created and sent/broadcast by that end-user. To this end, the user interface of the interaction client 104 may include an icon that is user-selectable to enable a sending end-user to add specific content to his or her personal story.

A collection may also constitute a "live story," which is a collection of content from multiple end-users that is created manually, automatically, or using a combination of manual and automatic techniques. For example, a "live story" may constitute a curated stream of end-user-submitted content from various locations and events. End-users whose client devices have location services enabled and are at a common location event at a particular time may, for example, be presented with an option, via a user interface of the interaction client 104, to contribute content to a particular live story. The live story may be identified to the end-user by the interaction client 104, based on his or her location. The end result is a "live story" told from a community perspective.

A further type of content collection is known as a "location story," which enables an end-user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The sticker table 318 stores various data relating to digital stickers that may be associated with media content items or messages. By way of example, the sticker table 318 may store for each sticker a unique sticker identifier (ID), which may then be associated with various categories or tags, maintained in the tag table 320. Accordingly, at least with some examples, the sticker table 318, in combination with the tag table 320, may represent a sticker taxonomy, or a hierarchy of categories or tags, by which a collection of digital stickers is organized and maintained. As described in greater detail below, a "smart" reply sticker recommendation feature may utilize a machine learning model to generate relevance scores for stickers, or for the tags associated with the stickers, based on attributes and characteristics of a received message.

Figure 4:
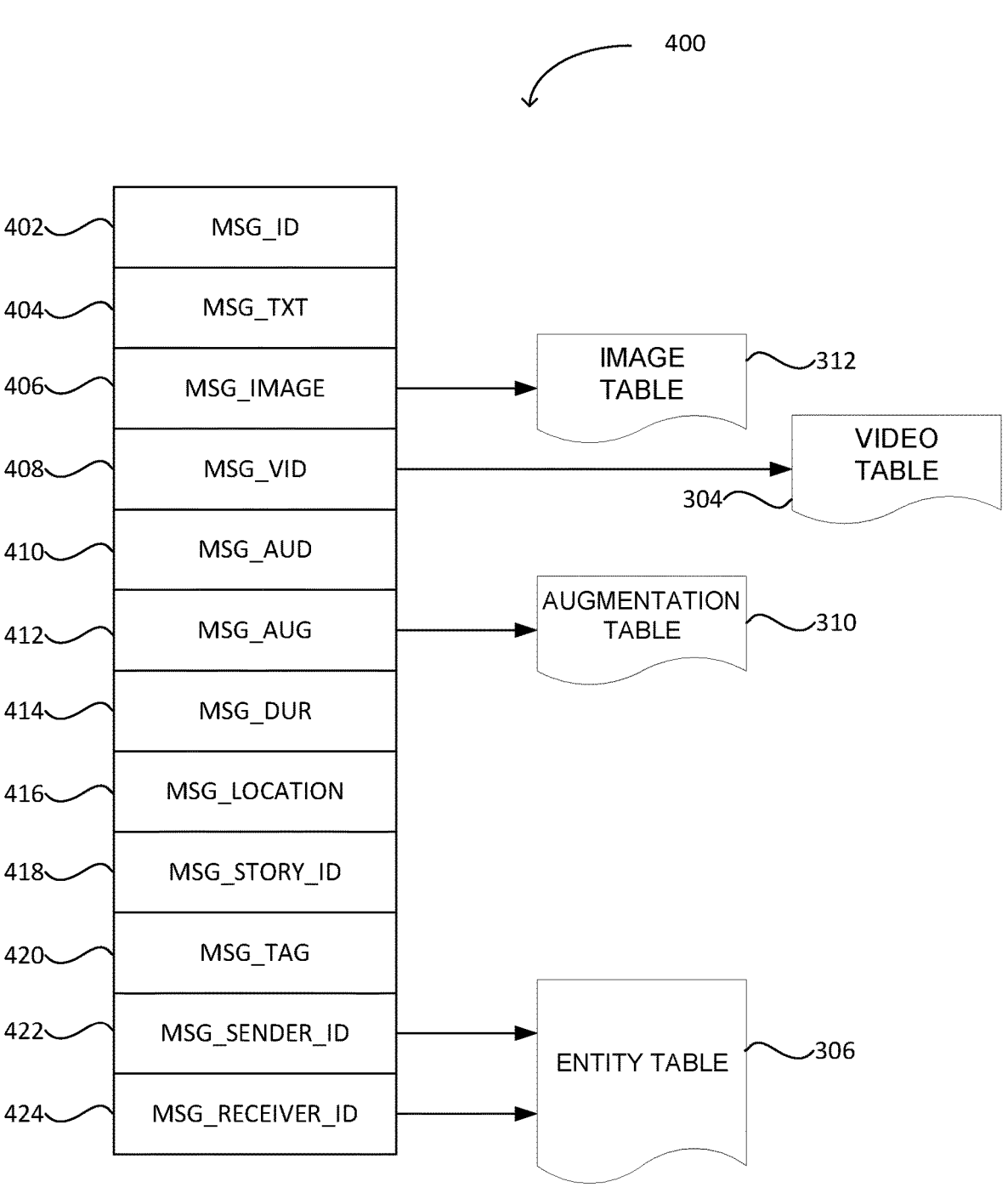
FIG. 4 is a diagrammatic representation of various component parts of a media content item or message, in accordance with some examples.

FIG. 4 is a schematic diagram illustrating a structure of a message 400, according to some examples, generated by a messaging or interaction client 104 for communication to a further messaging or interaction client 104 or the messaging system 212. The content of a particular message 400 is used to populate a record stored in the message table 302 of the database 120, accessible by the messaging system 212. Similarly, the content of a message 400 is stored in memory as "in-transit" or "in-flight" data of the user system 102 or the application or interactions servers 118. A message 400 is shown to include the following example components:

message identifier 402: a unique identifier that identifies the message 400.

message text payload 404: text, to be generated by an end-user via a user interface of the user system 102, and that is included in the message 400.

message image payload 406: image data, captured by a camera component of a user system 102 or retrieved from a memory component of a user system 102, and that is included in the message 400. Image data for a sent or received message 400 may be stored in the image table 316.

message video payload 408: video data, captured by a camera component or retrieved from a memory component of the user system 102, and that is included in the message 400. Video data for a sent or received message 400 may be stored in the video table 314.

message audio payload 410: audio data, captured by a microphone or retrieved from a memory component of the user system 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to an end-user via the messaging client 104.

message geolocation parameter 416: geolocation data (e.g., latitudinal, and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of an end-user of the user system 102 on which the message 400 was generated and from which the message 400 was sent.

message receiver identifier 424: an identifier (e.g., a messaging system identifier, email address, or device identifier) indicative of an end-user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to end-user records stored within an entity table 304.

Data Flow for Generative AI Stylized Images

Figure 5:
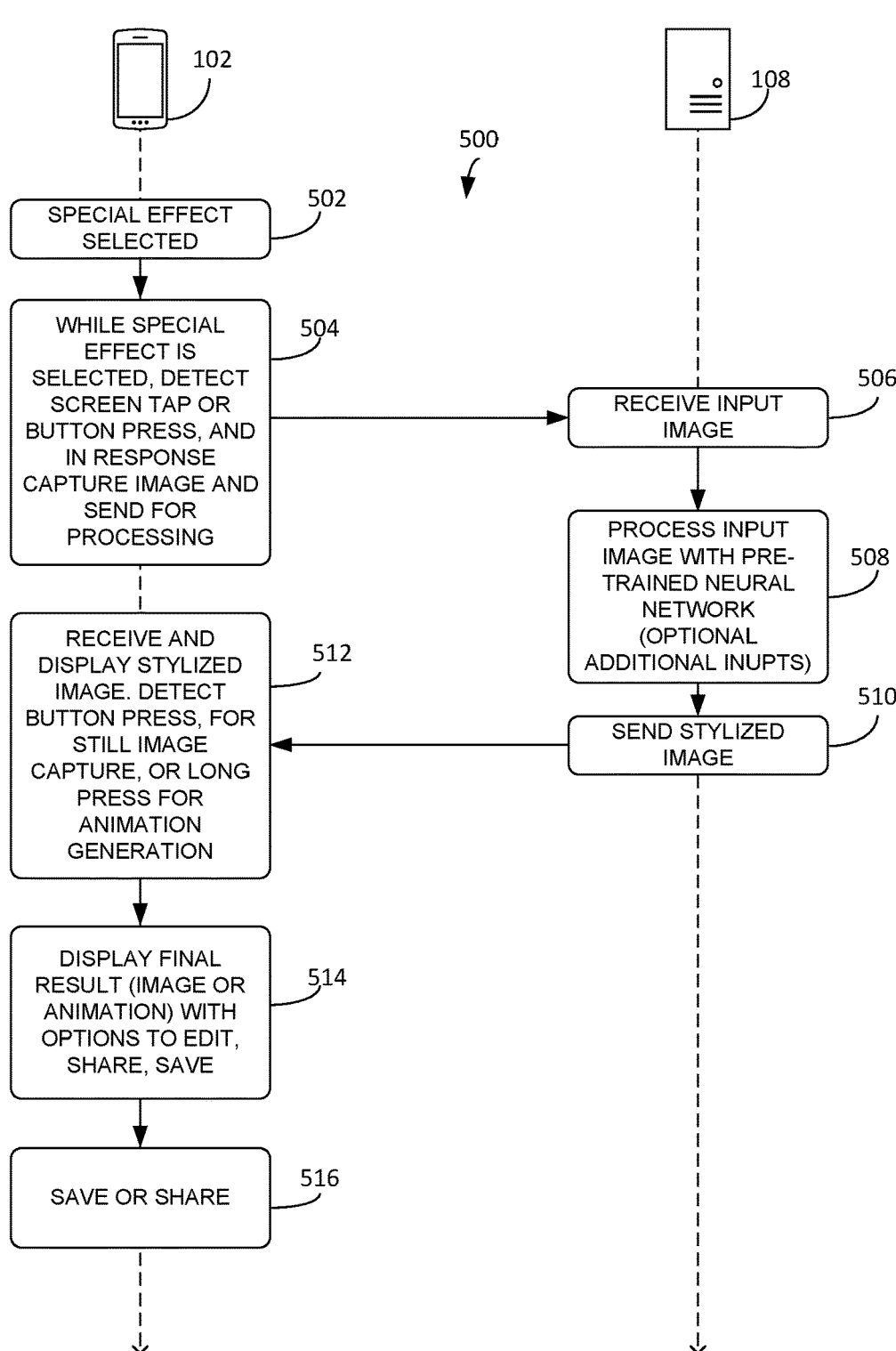
FIG. 5 is a flow diagram illustrating an example of the data processing and data flow that occurs when generating a stylized media content item, consistent with various examples.

FIG. 5 illustrates an example of the data processing and data flow that occurs when generating a stylized media content item, consistent with various examples. As illustrated in FIG. 5, a user system 102, for example, such as a mobile computing device, mobile phone, or similar, includes a mobile application (app) that facilitates the creating and sharing of media content items, and in particular, stylized media content items, to include stylized still images and stylized animations. When an end-user invokes the mobile app, a user interface for a content creation application is presented to the end-user. This user interface may be associated with a specific app, or a specific subset of functions and features for an app, which in some instances, may be referred to as a camera app. The camera app leverages one of the mobile computing device's image sensing devices (e.g., cameras) to create media content items. Specific examples of the user interface for the mobile app are presented in FIGS. 6, 7 and 8.

As shown in FIG. 5, the first processing step 502 involves detecting that the user has selected, via the user interface, a specific special effect—in this case, a special effect that leverages generative AI to create a stylized effect. Consistent with some examples, the camera app user interface displayed on the touch screen device of the mobile computing device will include a graphical user interface (GUI) element via which various end-user-selectable icons or graphics are presented, where each individual icon or graphic is associated with, and represents, a specific special effect that may be used to create a media content item. With some examples, the GUI element may be a carousel of special effects, where each individual element (e.g., icon or graphic) shown in the carousel represents a specific special effect that can be applied to an image or video captured with the image sensing device of the mobile computing device. Additionally, the special effects may be applied to previously captured media content items that may be stored in a system-accessible location, such as a camera roll that is provided as a feature of the specific operation system (OS) on which the mobile app is installed and executing. Accordingly, the end-user, while interacting with the user interface, may navigate the carousel showing the various special effects by swiping to the left and right. As the user navigates the carousel by swiping left and right, additional carousel elements (icons or graphics) are revealed in an animated way, where each element represents a different special effect. Consistent with some examples, each special effect may be referred to as a Lens®.

As illustrated in FIG. 5 with reference number 504, with the special effect selected, the camera app is monitoring for input, indicating a triggering event to take a photo. For example, upon selecting a specific special effect that uses a generative neural network to create a stylized image or animation, the user interface will prompt the end-user to tap a touch-screen display, or press a specific button, to capture an image with the front-facing camera of the mobile computing device. In some cases, it may be possible to select the rear facing camera. In any case, after the image is obtained (e.g., after an input has been detected), the image is captured and then encrypted, with an encryption key, and sent over a network to a server (e.g., interaction server system, 108) for further processing. In addition to the image itself, the mobile app 102 may communicate information identifying the special effect that the user has selected, and that is to be applied to the image. As shown in FIG. 5, at step 506, the original captured image is received at the interaction server system.

The next step 508 involves processing the image with a pre-trained neural network to generate a stylized image, based on the selected special effect. Consistent with some examples, after the server 108 receives and stores the image 506, the server 108 may reply to the mobile app by sending a link (e.g., URL) to the image, so that the mobile app can subsequently access the original input image as stored server-side, if necessary. Next, the link to the image and the encryption key for decrypting the image are communicated to an image processing component, for example, which may be part of the augmentation system 206. Upon receiving the link to the original image and the encryption key, the image processing component downloads the image, via the link, and the corresponding encryption key, then decrypts the image and provides the unencrypted image as input to a pre-trained neural network that processes the image to apply the stylized effect associated with the special effect that has been selected by the end-user.

Consistent with some examples, the original image is processed via a stylization pipeline that is based on a fine-tuned generative neural network model implementing a latent diffusion technique. In some examples, a pre-trained machine learning model (e.g., neural network) may exist for each of several end-user-selectable special effects, each special effect providing a specific image stylization. In other examples, a single machine learning model may be used, with additional inputs that impact the specific stylization applied to the input image. The machine learning model is executed in image-to-image mode, such that the input is, in part, an image, and the output is the stylized image.

With some embodiments, the image processing component may include a prompt constructor that generates a text-based prompt customized to the input image to provide as additional input to the machine learning model. Rather than selecting from predefined text prompts, the prompt constructor analyzes the input image to generate a descriptive prompt that characterizes the image content and attributes. This customized prompt allows guiding the transition in a way that better preserves important image features compared to a fixed template prompt. For example, the generated prompt may describe the number of people present, their poses and expressions, the lighting conditions, background scene, and other visual details. The machine learning model is trained to leverage these image descriptions to produce a more context-aware stylized output that transfers finer aspects of the original image. At least one part of the prompt includes an instruction relevant to the desired stylization, for example:

"Apply the style of Monet to the image."

"Transform the image into a Van Gogh-like painting."

"Stylize the image using the brushwork of Picasso."

"Create a watercolor version of the image."

"Apply an impressionistic style to the image, inspired by Renoir."

"Make the image look like a charcoal sketch."

"Give the image a vintage, sepia-tone effect."

"Apply a comic book-style filter to the image."

"Add a pointillism effect to the image, similar to Seurat."

"Create a pop art-inspired version of the image, reminiscent of Warhol."

As shown in FIG. 5 with reference 510, once the stylized output image has been generated with the specific stylization effect, the final output image is stored for subsequent recall, and a link to the output image is provided to the mobile application 102, which downloads the image and presents the image to the end-user via the touch-screen display.

Next, at step 512, the stylized image is presented to the user in the user interface. At least with some embodiments, when the stylized image is presented, the user may take an action—for example, press a button presented on the touch-screen display—to save the stylized image to the mobile device. Alternatively, a second type of input—e.g., another button or a long press—may allow the user to generate an animation using the stylized image. Specifically, the animation may show a transition effect from the original captured image, as captured at the step with reference 504, to the stylized image, as output by the machine learned model, for example, by the operation with reference 508.

Finally, at the step with reference 514, the final result (e.g., stylized image or stylized animation) is presented to the user, with different GUI elements that enable different options (e.g., save, share, send, discard, start over, etc.).

Consistent with some examples, the stylization pipeline leverages a machine learning model, such as a neural network implementing a process consistent with a latent diffusion technique. The model is trained or fine-tuned as follows. First, the pre-trained neural network model is executed in text-to-image mode, and several text prompts are provided, sequentially, as input, to generate a reference image for each text-based prompt. For instance, each text-based prompt may instruct the model to generate an image having one of several specific stylization effects. The output reference images, generated in text-to-image mode, are used in fine-tuning of the model, in part because fine-tuning on images (as opposed to text) tends to be more predictable and controllable, as compared to fine-tuning with text-based prompts.

Once the reference images are generated, the reference images are analyzed or inspected (e.g., by a human expert) to organize the reference images by their common style, while also ensuring there is a diversity of unique styles, and eliminating any specific reference images that have undesired artifacts.

With some embodiments, the reference images are provided as input to one or more pre-trained models for generating additional information characterizing each image. For example, an image may be processed using one or more pre-trained models to identify objects within the image, identify facial landmarks for a face detected in an image, perform segmentation of the image. The data generated by the pre-processing of the images can be used to control the final processing where the stylization effect is applied to the image. For example, the generated information can be used to improve the latent diffusion processing (with a neural network-based model such as the open source Stable Diffusion model) by controlling aspects of the processing, for example, by instructing the model to focus only on a face area, better preserve skin color during transformation, and so forth.

The reference images, organized by individual style, are then used along with the image data derived through the pre-processing techniques, to fine-tune the pre-trained model, so that at inference time, given an input image and a text prompt, and optionally image characteristics determined during the pre-processing of the image, the fined-tuned model will generate an output image having specific stylization characteristics or effects.

User Interface(s)

Figure 6:
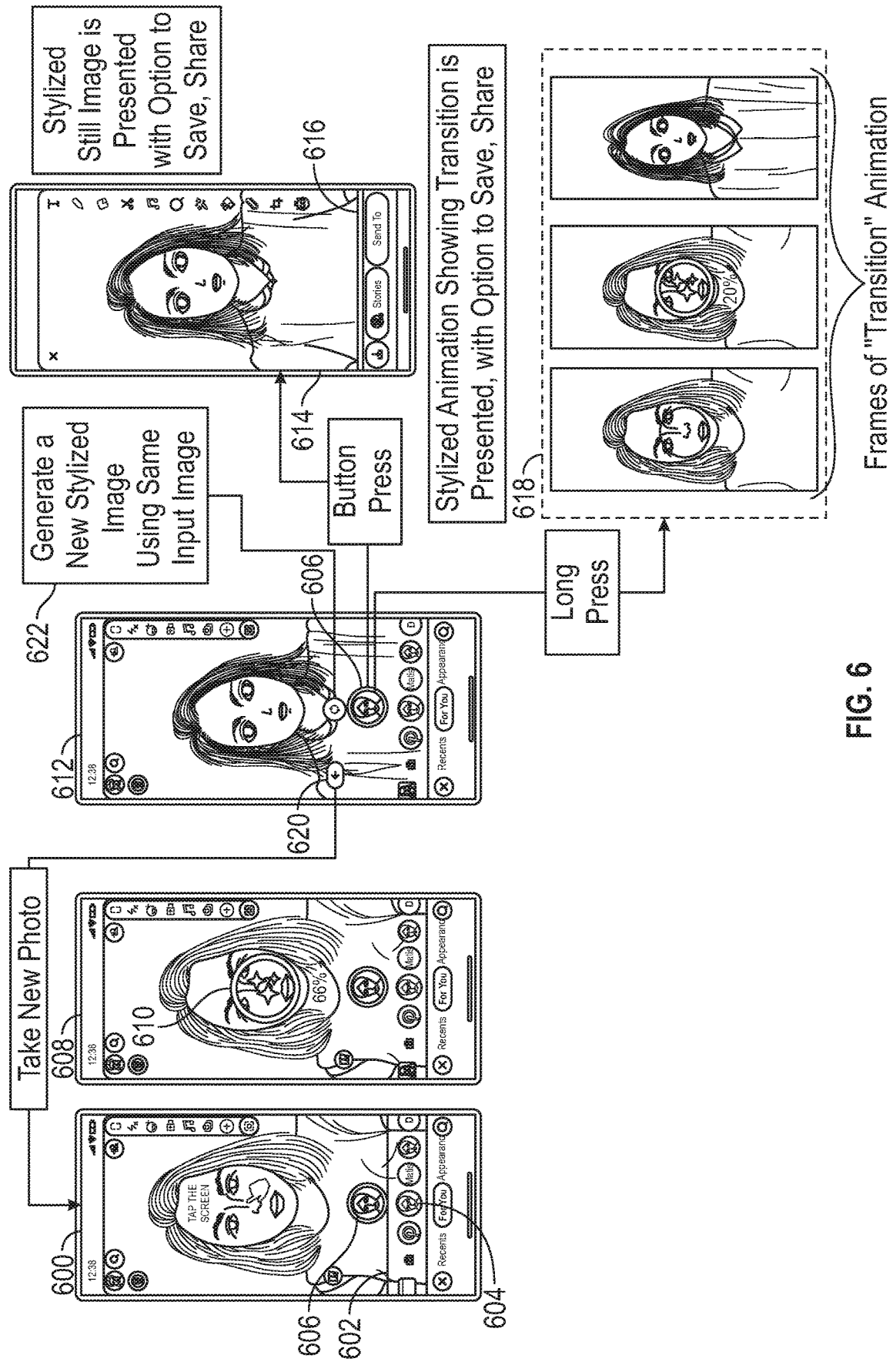
FIG. 6 is a user interface diagram illustrating one example of a user interface for a mobile application that facilitates the generating of a stylized media content item, consistent with some examples.

FIG. 6 is a user interface diagram illustrating an example of the user interface and corresponding flow associated with one technique for generating a stylized image, based on an end-user-selected special effect, consistent with some examples. As illustrated in FIG. 6, the camera app is activated and the user interface 600 depicts a real-time view or presentation of what is being sensed or captured by the front-facing camera of the mobile computing device. In this example, the live image is that of the end-user's face. The user interface element with reference number 602 is an example of a carousel, where each element in the carouse (e.g., each circular icon or graphic) represents an individual special effect that might be selected and applied to the real-time image. As the end-user scrolls, by swiping left or right, through the elements presented in the carousel 602, the end-user eventually selects a particular element 604 or graphic that is associated with a special effect that involves generating a stylized image using a generative neural network technique, such as latent diffusion, as implemented with a neural network model. When the end-user selects the specific special effect associated with the icon 604, a user interface element (e.g., the button 606) appears above the icon 602 representing the selected special effect. Consistent with some embodiments, the image presented within the circular area of the button 606 depicts an example of the stylization effect that will be applied to an input image, when the end-user captures the input image. Accordingly, as the end-user is viewing the real-time image captured by the front-facing camera, the end-user is prompted to "tap the screen" or possibly to push the button 606 to capture an image.

Next, after the end-user taps the screen or the button 606 to capture an image, the image is communicated to the server where it is processed using the pre-trained neural network, which will generate a stylized image based on the input image. While the stylized output image is being generated, the user interface 608 presents an animation 610 to indicate that the image processing is occurring.

Once the output image—that is, the stylized image—has been generated and communicated back to the mobile app executing on the mobile computing device, the user interface, as shown with reference number 612, is updated by presenting the stylized image, along with several user interface elements that correspond with different actions the user might take. At this point, the end-user has the option of performing a button press (e.g., a short press) of the button with reference number 606, or the end-user can perform a long press of the button 606. When the end-user simply presses the button 606, the stylized image being presented is saved or stored, and the user interface 614 is updated to reflect various options (e.g., the end-user can save the image to a predefined storage space, share the image via a social network feed, or send the image directly to one or more other end-users of the mobile app), as shown by the different user interface elements presented within the box having reference number 616.

If, instead of performing a regular or short button press, the end-user performs a long press of the button 606, a transition animation is generated and presented via the user interface 618. As shown with reference number 618, several of the individual frames of the transition animation are presented, to convey an example of what an end-user might see. The transition animation may be derived, for example, as a morphing transition, where the animation shows variations of the image as it morphs from its original state (e.g., the originally captured image), to its final state where it is shown with the stylized effect. With some examples, the loading animation 610 may be presented as part of the transition animation 618. However, in other instances, the loading animation 610 may not be presented. In any case, once the transition animation is generated, the user interface is updated to provide various options-similar to those presented in the box with reference 616.

Referring again to the user interface with reference number 612, the user interface includes a user interface element, for example, button 620, which, when selected, will allow the end-user to start the process over, such that the end-user can attempt to generate a new stylized image based on a new input image. For instance, if the end-user selects the button 620, the user interface will be refreshed to that depicted with reference 600, allowing the end-user to start the entire process over by capturing a new original image. However, in addition to button 620, another button 622 is presented in the user interface 612, which, when selected, will cause a new version of the same input image to be generated using the same stylized effect. For example, by pressing the "refresh" button 622, a new (e.g., second) version of the stylized image can be generated, using the original captured image. Consistent with some embodiments, because the original image is temporarily stored at the server, the image itself need not be sent to the server a second time, but instead, an instruction or request that references the link at which the original image is stored may be communicated.

Figure 7:
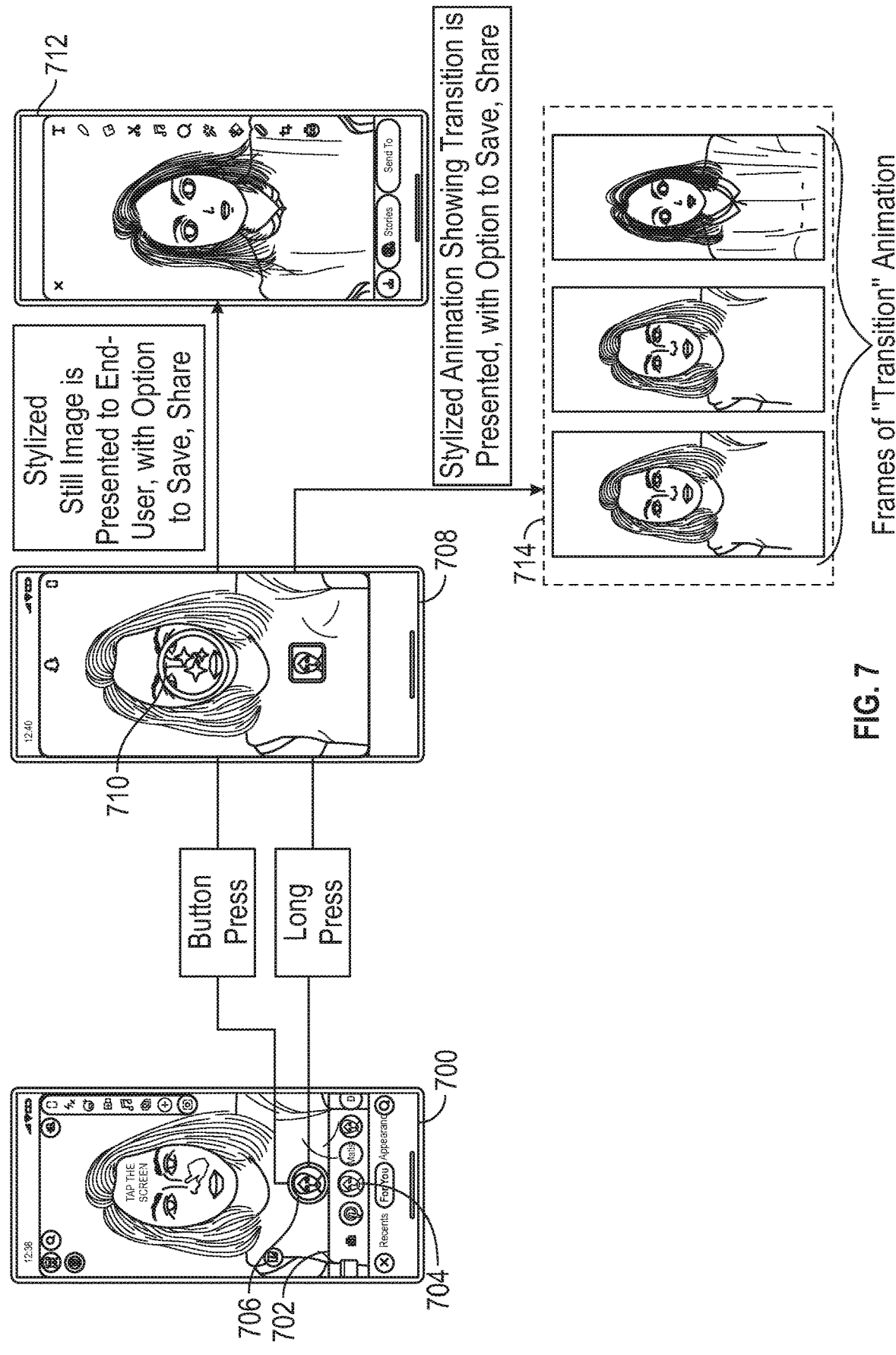
FIG. 7 is a user interface diagram illustrating one example of a user interface for a mobile application that facilitates the generating of a stylized media content item, consistent with some examples.

FIG. 7 is a user interface diagram illustrating another example of the user interface and corresponding flow associated with another technique for generating a stylized image or animation, based on an end-user-selected special effect, consistent with some examples. In comparison with what is presented in FIG. 6, the user interface flow presented in FIG. 7 is a simplified or shorter version. In this example, the user interface 700 includes a carousel 702 for selecting among several elements (e.g., graphics or icons) a single element 704, representing a specific special effect to be applied to an image—in this case, a special effect that involves generating a stylized image using a generative neural network. After the end-user selects the specific special effect from the special effect carousel 702, the end-user can generate a stylized image or animation by simply pressing, or long pressing, respectively, the button with reference number 706 of the user interface 700. An intermediate user interface 708 is then presented with an animation 710 to indicate the stylized media content item is being generated, before the end-user is finally presented with a final result. If the end-user performed a regular press of the button 706, the end-user will be presented with a stylized image, as shown in the user interface with reference 712. The user interface includes various user interface elements that enable th end-user to save the stylized image and share the stylized image. If the end-user performed a long press of the button 706, the end-user will be presented with an animation 714 showing a transition effect, where the original captured image transitions to the stylized image, as output by the generated AI model. It is worth noting that the generating of the transition animation may be performed on the client side (e.g., at the mobile computing device) or alternatively, on the server side.

Figure 8:
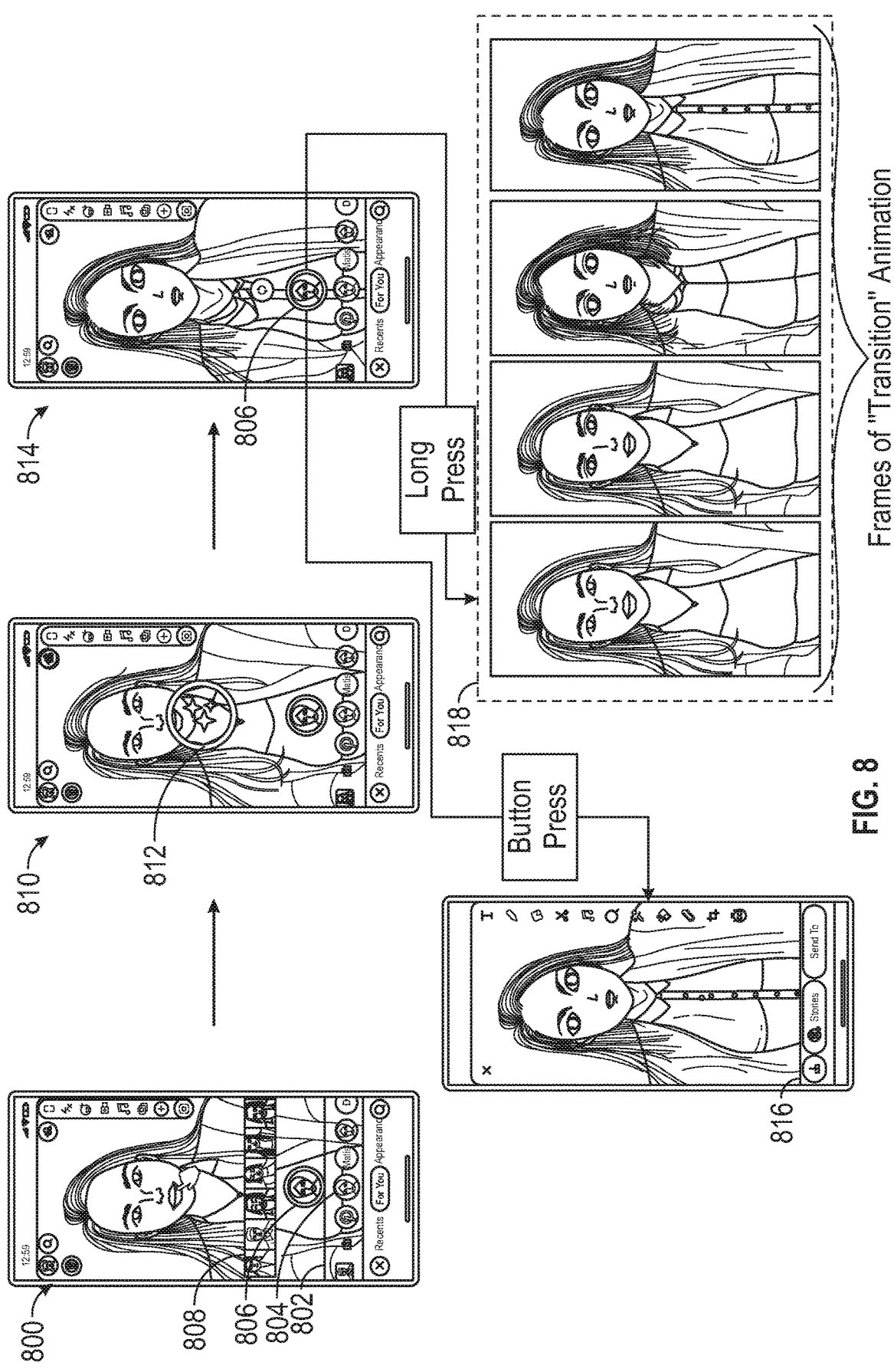
FIG. 8 is a user interface diagram illustrating one example of a user interface for a mobile application that facilitates the generating of a stylized media content item, consistent with some examples.

FIG. 8 is yet another user interface diagram illustrating another example of a user interface flow associated with a technique for generating a stylized image, based on an end-user-selected special effect. In this example, the flow is generally similar to that presented in connection with FIG. 6, however, the end-user is presented with an option to select an existing image from his or her camera roll. For example, a camera roll is the name of a default storage location for images, as provided by an operating system (OS) of the mobile app. Using an application programming interface (API), the mobile app is able to access and present saved images from the camera roll. Accordingly, the end-user can generate a stylized image using as an input image any image that the end-user can select from his or her camera roll.

In this example, the user interface 800 includes a carousel 802 for selecting a specific special effect 804. Upon detecting that the specific special effect has been selected, a button 806 is presented, in addition to a user interface element 808 depicting a selection of images stored on the camera roll of the end-user. Accordingly, if the end-user would like to generate a stylized image using a previously captured image, the end-user can simply select an image from the camera roll.

Upon selecting an image from the camera roll, the selected image is communicated to the server where it will be processed to generate a stylized version of the image, consistent with the selected special effect. During this time, an animation 812 may be presented, as indicated in the user interface with reference 810.

When the stylized image is communicated back to the mobile app, the stylized image is presented to the end-user, as shown in the user interface with reference number 814. If the end-user would like to save or share the stylized image, the end-user can simply press the button 806, as shown in user interface 814. Upon pressing the button 806, the end-user will be presented with options 816 to save or share the stylized image. However, if the end-user prefers to generate a transition animation based on the stylized image, the end-user can perform a long press of the button 806. Upon performing a long press, a transition animation 818 will be generated and presented to the end-user with options to save and/or share the animation.

Machine Architecture

Figure 9:
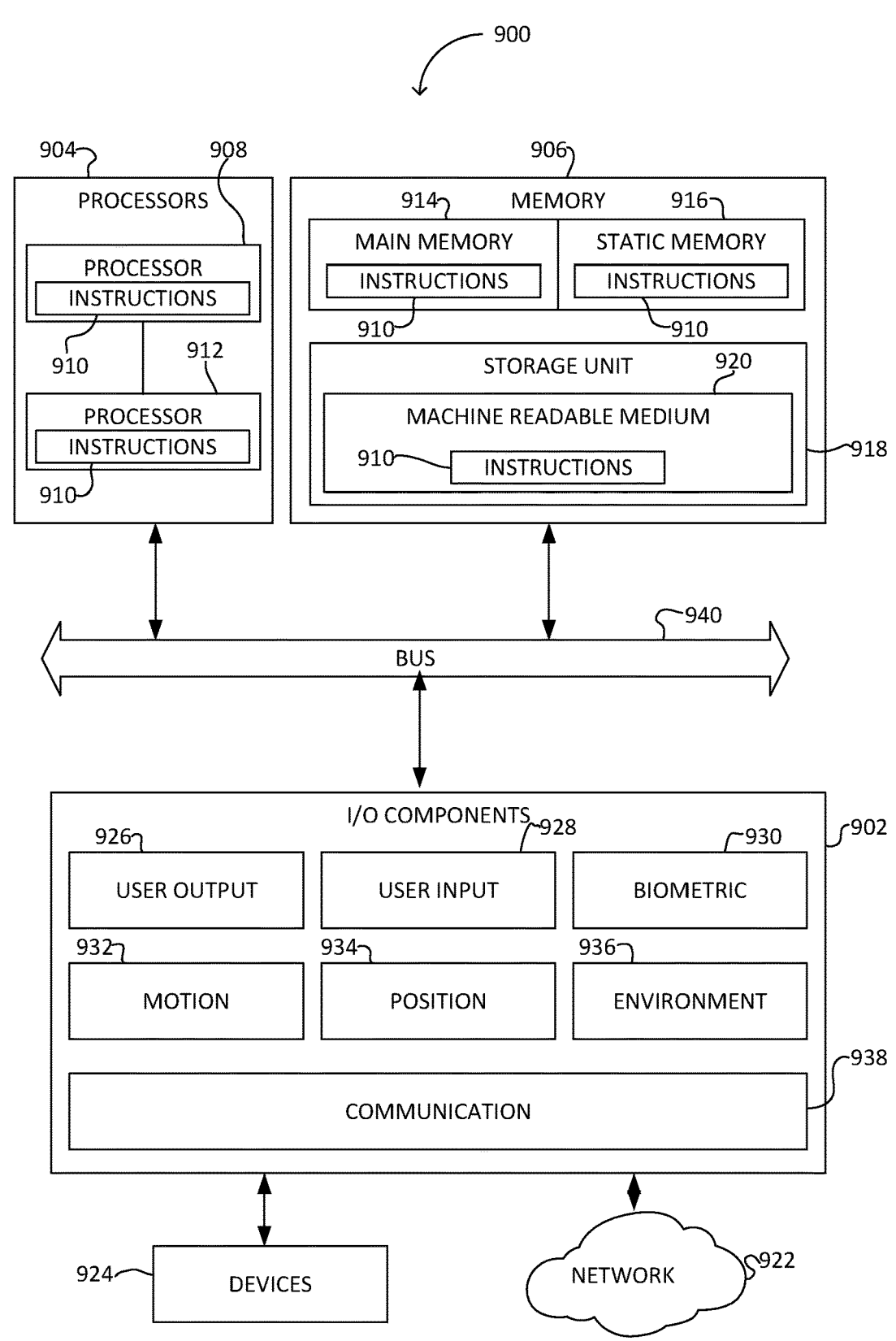
FIG. 9 is a diagrammatic representation of a machine in the form of a computer system within which a set of instructions may be executed for causing the machine to perform any one or more of the methodologies discussed herein, according to some examples.

FIG. 9 is a diagrammatic representation of a machine 900 within which instructions 910 (e.g., software, a program, an application or app, a mini-app, an applet, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine (e.g., client computing device) in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while a single machine 900 is illustrated, the term "machine" shall also be taken to include a collection of machines that individually or jointly execute the instructions 910 to perform any one or more of the methodologies discussed herein. The machine 900, for example, may comprise the user system 102 or any one of multiple server devices forming part of the interaction server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, all accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include end-user output components 926 and end-user input components 928. The end-user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The end-user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 830, motion components 932, environmental components 936, or position components 934, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The environmental components 936 include, for example, one or more image sensors or cameras (with still image/ photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system 204 comprising, for example, front cameras on a front surface of the user system 102 and rear cameras on a rear surface of the user system 102. The front cameras may, for example, be used to capture still images and video of an end-user of the user system 102 (e.g., "selfies"), which may then be augmented with augmentation data (e.g., filters) as referenced above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system 204 of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 838 operable to couple the machine 900 to a network 922 or devices 924 via respective coupling or connections. For example, the communication components 938 may include a network interface component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
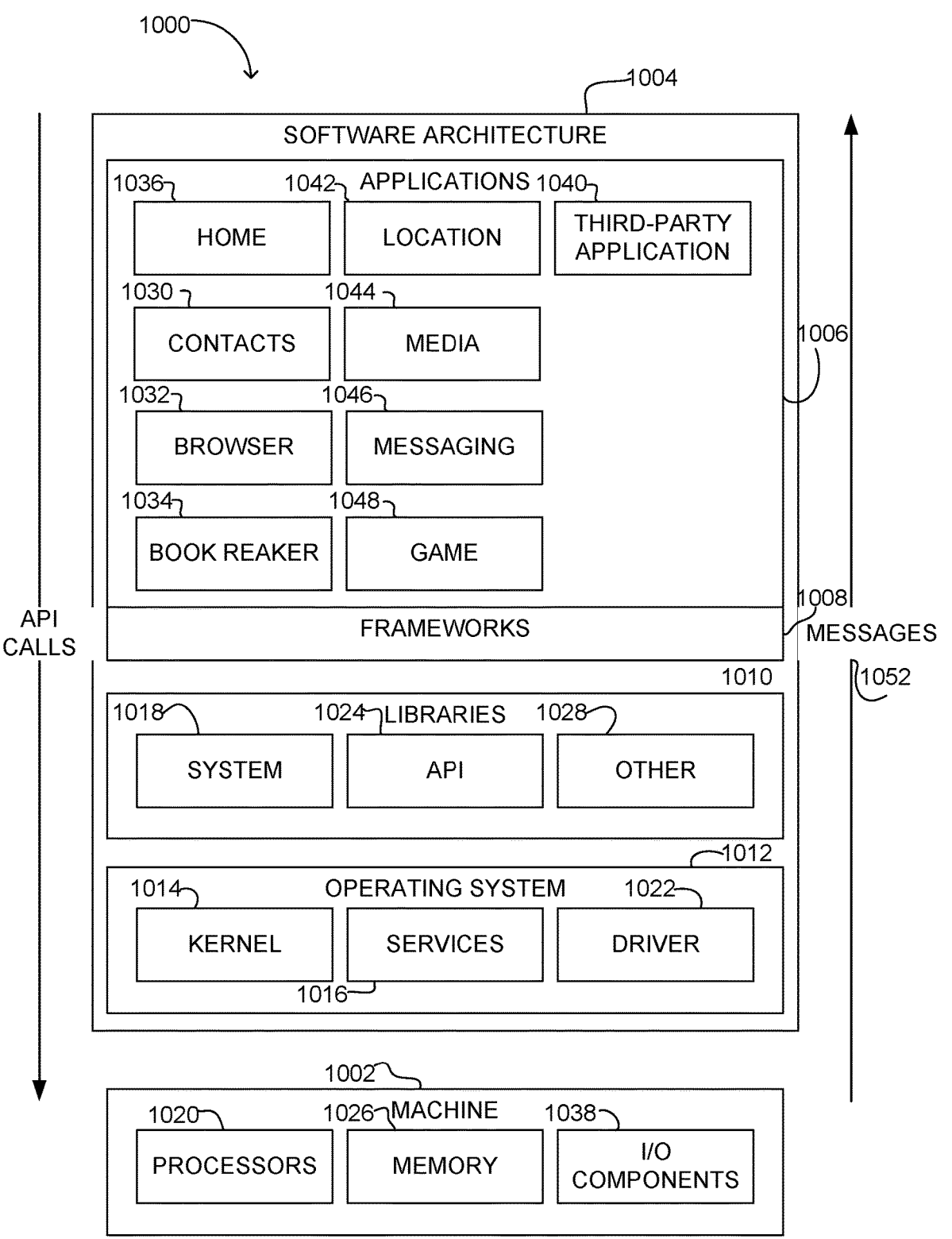
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionalities. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionalities described herein.

EXAMPLES

Example 1 is an apparatus comprising: a processor; an image sensor; a display; a memory storage device storing instruction thereon, which, when executed by the processor, will cause the apparatus to perform operations comprising: presenting via a user interface of the display a plurality of selectable elements, each selectable element associated with a special effect to be applied to an image or video stream captured via the image sensor; detecting selection of a first element of the plurality of selectable elements, the first element associated with a special effect that is to be generated with a deep generative neural network configured to generate and output a stylized version of an input image; responsive to detecting an end-user input, capturing an image via the image sensor and communicating the captured image over a network to a server to be processed by the deep generative neural network; receiving over a network an altered version of the image from the server, wherein the altered image is a stylized version of the captured image that has been generated and outputted by the deep generative neural network; and presenting the stylized version of the captured image via the user interface on the display.

In Example 2, the subject matter of Example 1 includes, wherein the display is a touchscreen display, and presenting the plurality of selectable elements comprises: presenting, via the touchscreen display a carousel, depicting a portion of the plurality of selectable elements, wherein the carousel is navigable by an end-user swiping left and/or right on the touchscreen display to cause additional selectable elements associated with additional special effects to be displayed.

In Example 3, the subject matter of Examples 1-2 includes, wherein the memory further stores instructions, which, when executed by the processor, cause the apparatus to perform operations comprising: presenting via the user interface on the display a first option to save the altered version of the captured image, and a second option to share the altered version of the captured image.

In Example 4, the subject matter of Example 3 includes, wherein the memory further stores instructions, which, when executed by the processor, cause the apparatus to perform operations comprising: presenting via the user interface a third option to generate an animation depicting a transition between the captured image and the altered version of the captured image; detecting selection of the third option; in response to detecting selection of the third option: identifying differences between the captured image and the altered version of the captured image; generating a plurality of intermediate frames depicting gradual changes from the captured image to the altered version of the captured image based on the identified differences; encoding the plurality of intermediate frames into a video file; and presenting the video file comprising the plurality of intermediate frames via the user interface, the video file, when played, depicting the transition between the captured image and the altered version of the captured image.

In Example 5, the subject matter of Examples 1-4 includes, wherein the memory further stores instructions, which, when executed by the processor, cause the apparatus to perform operations comprising: prior to communicating the captured image to the server, encrypting the captured image using a first encryption key; wherein the server is configured to decrypt the captured image using a second encryption key before processing the captured image with the deep generative neural network.

In Example 6, the subject matter of Examples 1-5 includes, wherein the memory further stores instructions, which, when executed by the processor, cause the apparatus to perform operations comprising: upon detecting selection of the first element of the plurality of selectable elements, presenting a preview image, depicting a sample output generated by the deep generative neural network having applied the special effect associated with a respective selectable element to a sample input image.

In Example 7, the subject matter of Examples 1-6 includes, wherein the memory further stores instructions, which when executed by the processor, cause the processor to perform operations comprising: upon detecting selection of the first element of the plurality of selectable elements, determining an identifier associated with the first element, the identifier indicating the special effect associated with the first element; transmitting the identifier to the server together with the captured image; wherein the server is configured to: construct a prompt to input to the deep generative neural network based on the transmitted identifier, the prompt comprising text instructions consistent with generating the special effect associated with the identifier; and input the prompt and the captured image to the deep generative neural network; wherein the deep generative neural network is pre-trained to generate a stylized version of an input image based on text instructions provided in the prompt.

In Example 8, the subject matter of Examples 1-7 includes, wherein the memory further stores instructions, which when executed by the processor, cause the processor to perform operations comprising: presenting, together with presenting the altered version of the captured image, an option to generate a new altered version of the captured image; detecting selection of the option to generate the new altered version; in response to detecting selection of the option, communicating the previously captured image to the server to be re-processed by the deep generative neural network to generate the new altered version of the captured image; receiving the new altered version of the previously captured image from the server; and presenting the new altered version of the previously captured image via the user interface.

In Example 9, the subject matter of Examples 1-8 includes, wherein the memory further stores instructions, which, when executed by the processor, cause the apparatus to perform operations comprising: presenting, together with the altered version of the captured image, an option to generate a new altered version of the captured image; detecting selection of the option to generate the new altered version; in response to detecting selection of the option, transmitting to the server a request to generate a new altered version, the request including a link to the previously captured image stored at the server; receiving the new altered version of the previously captured image from the server; and presenting the new altered version of the previously captured image via the user interface.

Example 10 is a computer-implemented method comprising: presenting via a user interface of the display a plurality of selectable elements, each selectable element associated with a special effect to be applied to an image or video stream captured via the image sensor; detecting selection of a first element of the plurality of selectable elements, the first element associated with a special effect that is to be generated with a deep generative neural network configured to generate and output a stylized version of an input image; responsive to detecting an end-user input, capturing an image via the image sensor and communicating the captured image over a network to a server to be processed by the deep generative neural network; receiving over a network an altered version of the image from the server, wherein the altered image is a stylized version of the captured image that has been generated and outputted by the deep generative neural network; and presenting the stylized version of the captured image via the user interface on the display.

In Example 11, the subject matter of Example 10 includes, wherein the display is a touchscreen display, and presenting the plurality of selectable elements comprises: presenting, via the touchscreen display a carousel, depicting a portion of the plurality of selectable elements, wherein the carousel is navigable by an end-user swiping left and/or right on the touchscreen display to cause additional selectable elements associated with additional special effects to be displayed.

In Example 12, the subject matter of Examples 10-11 includes, wherein the memory further stores instructions, which, when executed by the processor, cause the apparatus to perform operations comprising: presenting via the user interface on the display a first option to save the altered version of the captured image, and a second option to share the altered version of the captured image.

In Example 13, the subject matter of Examples 10-12 includes, presenting via the user interface a third option to generate an animation depicting a transition between the captured image and the altered version of the captured image; detecting selection of the third option; in response to detecting selection of the third option: identifying differences between the captured image and the altered version of the captured image; generating a plurality of intermediate frames depicting gradual changes from the captured image to the altered version of the captured image based on the identified differences; encoding the plurality of intermediate frames into a video file; and presenting the video file comprising the plurality of intermediate frames via the user interface, the video file, when played, depicting the transition between the captured image and the altered version of the captured image.

In Example 14, the subject matter of Examples 10-13 includes, prior to communicating the captured image to the server, encrypting the captured image using a first encryption key; wherein the server is configured to decrypt the captured image using a second encryption key before processing the captured image with the deep generative neural network.

In Example 15, the subject matter of Examples 10-14 includes, upon detecting selection of the first element of the plurality of selectable elements, presenting a preview image, depicting a sample output generated by the deep generative neural network having applied the special effect associated with a respective selectable element to a sample input image.

In Example 16, the subject matter of Examples 10-15 includes, upon detecting selection of the first element of the plurality of selectable elements, determining an identifier associated with the first element, the identifier indicating the special effect associated with the first element; transmitting the identifier to the server together with the captured image; wherein the server is configured to: construct a prompt to input to the deep generative neural network based on the transmitted identifier, the prompt comprising text instructions consistent with generating the special effect associated with the identifier; and input the prompt and the captured image to the deep generative neural network; wherein the deep generative neural network is pre-trained to generate a stylized version of an input image based on text instructions provided in the prompt.

In Example 17, the subject matter of Examples 10-16 includes, presenting, together with presenting the altered version of the captured image, an option to generate a new altered version of the captured image; detecting selection of the option to generate the new altered version; in response to detecting selection of the option, communicating the previously captured image to the server to be re-processed by the deep generative neural network to generate the new altered version of the captured image; receiving the new altered version of the previously captured image from the server; and presenting the new altered version of the previously captured image via the user interface.

In Example 18, the subject matter of Examples 10-17 includes, presenting, together with the altered version of the captured image, an option to generate a new altered version of the captured image; detecting selection of the option to generate the new altered version; in response to detecting selection of the option, transmitting to the server a request to generate a new altered version, the request including a link to the previously captured image stored at the server; receiving the new altered version of the previously captured image from the server; and presenting the new altered version of the previously captured image via the user interface.

Example 19 is an apparatus comprising: means for presenting via a user interface of the display a plurality of selectable elements, each selectable element associated with a special effect to be applied to an image or video stream captured via the image sensor; means for detecting selection of a first element of the plurality of selectable elements, the first element associated with a special effect that is to be generated with a deep generative neural network configured to generate and output a stylized version of an input image; means for capturing an image via the image sensor and communicating the captured image over a network to a server to be processed by the deep generative neural network, responsive to detecting an end-user input; means for receiving over a network an altered version of the image from the server, wherein the altered image is a stylized version of the captured image that has been generated and outputted by the deep generative neural network; and means for presenting the stylized version of the captured image via the user interface on the display.

In Example 20, the subject matter of Example 19 includes, presenting the plurality of selectable elements comprises: presenting a carousel depicting a portion of the plurality of selectable elements, wherein the carousel is navigable by an end-user swiping left and/or right to cause additional selectable elements associated with additional special effects to be displayed.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

GLOSSARY

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine. "Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Sticker" refers to a type of digital image that may be used to convey emotions, reactions, or messages in a messaging conversation. Stickers are often larger and more expressive than regular emojis, and they may feature characters, illustrations, or animations. Stickers can be sent as standalone messages, or they can be added to a message to enhance its meaning or add a playful element to the conversation. Some messaging applications allow users to download and use custom sticker packs, while others offer a selection of built-in stickers.

"User device" refers, for example, to a device accessed, controlled or owned by a user and with which the user interacts to perform an action or interaction on the user device, including an interaction with other users or computer systems. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that an end-user may use to access a network.

What is claimed is:

1. An apparatus comprising:
   a processor;
   an image sensor;
   a display;
   a memory storage device storing instruction thereon, which, when executed by the processor, will cause the apparatus to perform operations comprising:

presenting via a user interface of the display a plurality of selectable elements, each selectable element associated with a special effect to be applied to an image or video stream captured via the image sensor;

detecting selection of a first element of the plurality of selectable elements, the first element associated with a special effect that is to be generated with a deep generative neural network configured to generate and output a stylized version of an input image;

responsive to detecting an end-user input, capturing an image via the image sensor and communicating the captured image over a network to a server to be processed by the deep generative neural network;

receiving over a network an altered version of the image from the server, wherein the altered image is a stylized version of the captured image that has been generated and outputted by the deep generative neural network;

presenting the stylized version of the captured image via the user interface on the display;

presenting via the user interface an option to generate an animation depicting a transition between the captured image and the altered version of the captured image;

in response to detecting selection of the option:

identifying differences between the captured image and the altered version of the captured image;

generating a plurality of intermediate frames depicting gradual changes from the captured image to the altered version of the captured image based on the identified differences;

encoding the plurality of intermediate frames into a video file; and presenting the video file comprising the plurality of intermediate frames via the user interface, the video file, when played, depicting the transition between the captured image and the altered version of the captured image.

2. The apparatus of claim 1, wherein the display is a touchscreen display, and presenting the plurality of selectable elements comprises:

presenting, via the touchscreen display a carousel, depicting a portion of the plurality of selectable elements, wherein the carousel is navigable by an end-user swiping left and/or right on the touchscreen display to cause additional selectable elements associated with additional special effects to be displayed.

3. The apparatus of claim 1, wherein the memory further stores instructions, which, when executed by the processor, cause the apparatus to perform operations comprising:

presenting via the user interface on the display a first option to save the altered version of the captured image, and a second option to share the altered version of the captured image.

4. The apparatus of claim 1, wherein the memory further stores instructions, which, when executed by the processor, cause the apparatus to perform operations comprising:

prior to communicating the captured image to the server, encrypting the captured image using a first encryption key;

wherein the server is configured to decrypt the captured image using a second encryption key before processing the captured image with the deep generative neural network.

5. The apparatus of claim 1, wherein the memory further stores instructions, which, when executed by the processor, cause the apparatus to perform operations comprising:

upon detecting selection of the first element of the plurality of selectable elements, presenting a preview image, depicting a sample output generated by the deep generative neural network having applied the special effect associated with a respective selectable element to a sample input image.

6. The apparatus of claim 1, wherein the memory further stores instructions, which when executed by the processor, cause the processor to perform operations comprising:

upon detecting selection of the first element of the plurality of selectable elements, determining an identifier associated with the first element, the identifier indicating the special effect associated with the first element;

transmitting the identifier to the server together with the captured image;

wherein the server is configured to:

construct a prompt to input to the deep generative neural network based on the transmitted identifier, the prompt comprising text instructions consistent with generating the special effect associated with the identifier; and input the prompt and the captured image to the deep generative neural network;

wherein the deep generative neural network is pre-trained to generate a stylized version of an input image based on text instructions provided in the prompt.

7. The apparatus of claim 1, wherein the memory further stores instructions, which when executed by the processor, cause the processor to perform operations comprising:

presenting, together with presenting the altered version of the captured image, an option to generate a new altered version of the captured image;

detecting selection of the option to generate the new altered version;

in response to detecting selection of the option, communicating the previously captured image to the server to be re-processed by the deep generative neural network to generate the new altered version of the captured image;

receiving the new altered version of the previously captured image from the server; and presenting the new altered version of the previously captured image via the user interface.

8. The apparatus of claim 1, wherein the memory further stores instructions, which, when executed by the processor, cause the apparatus to perform operations comprising:

presenting, together with the altered version of the captured image, an option to generate a new altered version of the captured image;

detecting selection of the option to generate the new altered version;

in response to detecting selection of the option, transmitting to the server a request to generate a new altered version, the request including a link to the previously captured image stored at the server;

receiving the new altered version of the previously captured image from the server; and presenting the new altered version of the previously captured image via the user interface.

9. A computer-implemented method comprising:

presenting via a user interface of a display a plurality of selectable elements, each selectable element associated with a special effect to be applied to an image or video stream captured via an image sensor;

detecting selection of a first element of the plurality of selectable elements, the first element associated with a special effect that is to be generated with a deep generative neural network configured to generate and output a stylized version of an input image;

responsive to detecting an end-user input, capturing an image via the image sensor and communicating the captured image over a network to a server to be processed by the deep generative neural network;

receiving over a network an altered version of the image from the server, wherein the altered image is a stylized version of the captured image that has been generated and outputted by the deep generative neural network;

presenting the stylized version of the captured image via the user interface on the display;

presenting via the user interface an option to generate an animation depicting a transition between the captured image and the altered version of the captured image;

in response to detecting selection of the option:

identifying differences between the captured image and the altered version of the captured image;

generating a plurality of intermediate frames depicting gradual changes from the captured image to the altered version of the captured image based on the identified differences;

encoding the plurality of intermediate frames into a video file; and presenting the video file comprising the plurality of intermediate frames via the user interface, the video file, when played, depicting the transition between the captured image and the altered version of the captured image.

10. The computer-implemented method of claim 9, wherein the display is a touchscreen display, and presenting the plurality of selectable elements comprises:

presenting, via the touchscreen display a carousel, depicting a portion of the plurality of selectable elements, wherein the carousel is navigable by an end-user swiping left and/or right on the touchscreen display to cause additional selectable elements associated with additional special effects to be displayed.

11. The computer-implemented method of claim 9, further comprising:

presenting via the user interface on the display a first option to save the altered version of the captured image, and a second option to share the altered version of the captured image.

12. The computer-implemented method of claim 9, further comprising:

prior to communicating the captured image to the server, encrypting the captured image using a first encryption key;

wherein the server is configured to decrypt the captured image using a second encryption key before processing the captured image with the deep generative neural network.

13. The computer-implemented method of claim 9, further comprising:

upon detecting selection of the first element of the plurality of selectable elements, presenting a preview image, depicting a sample output generated by the deep generative neural network having applied the special effect associated with a respective selectable element to a sample input image.

14. The computer-implemented method of claim 9, further comprising:

upon detecting selection of the first element of the plurality of selectable elements, determining an identifier associated with the first element, the identifier indicating the special effect associated with the first element;

transmitting the identifier to the server together with the captured image;

wherein the server is configured to:

construct a prompt to input to the deep generative neural network based on the transmitted identifier, the prompt comprising text instructions consistent with generating the special effect associated with the identifier; and input the prompt and the captured image to the deep generative neural network;

wherein the deep generative neural network is pre-trained to generate a stylized version of an input image based on text instructions provided in the prompt.

15. The computer-implemented method of claim 9, further comprising:

presenting, together with presenting the altered version of the captured image, an option to generate a new altered version of the captured image;

detecting selection of the option to generate the new altered version;

in response to detecting selection of the option, communicating the previously captured image to the server to be re-processed by the deep generative neural network to generate the new altered version of the captured image;

receiving the new altered version of the previously captured image from the server; and presenting the new altered version of the previously captured image via the user interface.

16. The computer-implemented method of claim 9, further comprising:

presenting, together with the altered version of the captured image, an option to generate a new altered version of the captured image;

detecting selection of the option to generate the new altered version;

in response to detecting selection of the option, transmitting to the server a request to generate a new altered version, the request including a link to the previously captured image stored at the server;

receiving the new altered version of the previously captured image from the server; and presenting the new altered version of the previously captured image via the user interface.

17. An apparatus comprising:

means for presenting via a user interface of a display a plurality of selectable elements, each selectable element associated with a special effect to be applied to an image or video stream captured via an image sensor;

means for detecting selection of a first element of the plurality of selectable elements, the first element associated with a special effect that is to be generated with a deep generative neural network configured to generate and output a stylized version of an input image;

means for capturing an image via the image sensor and communicating the captured image over a network to a server to be processed by the deep generative neural network, responsive to detecting an end-user input;

means for receiving over a network an altered version of the image from the server, wherein the altered image is a stylized version of the captured image that has been generated and outputted by the deep generative neural network;

means for presenting the stylized version of the captured image via the user interface on the display;

presenting via the user interface an option to generate an animation depicting a transition between the captured image and the altered version of the captured image;

in response to detecting selection of the option:

identifying differences between the captured image and the altered version of the captured image;

generating a plurality of intermediate frames depicting gradual changes from the captured image to the altered version of the captured image based on the identified differences;

encoding the plurality of intermediate frames into a video file; and presenting the video file comprising the plurality of intermediate frames via the user interface, the video file, when played, depicting the transition between the captured image and the altered version of the captured image.

18. The apparatus of claim 17, presenting the plurality of selectable elements comprises:

presenting a carousel depicting a portion of the plurality of selectable elements, wherein the carousel is navigable by an end-user swiping left and/or right to cause additional selectable elements associated with additional special effects to be displayed.

\* \* \* \* \*